United States Patent
Hernandez et al.

(10) Patent No.: US 9,948,567 B2
(45) Date of Patent: *Apr. 17, 2018

(54) SYSTEM AND METHOD FOR DYNAMIC RATE CONTROL IN ETHERNET FABRICS

(71) Applicant: DELL PRODUCTS, LP, Round Rock, TX (US)

(72) Inventors: Hendrich M. Hernandez, Round Rock, TX (US); Gaurav Chawla, Austin, TX (US); Robert L. Winter, Burnet, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/056,550

(22) Filed: Feb. 29, 2016

(65) Prior Publication Data
US 2016/0182389 A1    Jun. 23, 2016

Related U.S. Application Data

(63) Continuation of application No. 13/168,205, filed on Jun. 24, 2011, now Pat. No. 9,300,590.

(51) Int. Cl.
*H04L 12/835* (2013.01)
*G06F 5/12* (2006.01)

(52) U.S. Cl.
CPC ............... *H04L 47/30* (2013.01); *G06F 5/12* (2013.01)

(58) Field of Classification Search
CPC .................. H04L 47/30; G06F 5/12
See application file for complete search history.

(56) References Cited

U.S. PATENT DOCUMENTS

| | | | |
|---|---|---|---|
| 6,473,867 B2 | 10/2002 | Yamamoto et al. | |
| 7,076,606 B2 | 7/2006 | Orsley | |
| 7,340,672 B2 | 3/2008 | Goldschmidt et al. | |
| 7,551,559 B1 * | 6/2009 | Jonnala | H04L 63/1466 370/230 |
| 7,783,716 B2 | 8/2010 | Hayward | |
| 8,255,515 B1 * | 8/2012 | Melman | H04L 47/24 370/235 |
| 2006/0062233 A1 * | 3/2006 | Brewer | H04L 47/10 370/412 |
| 2006/0092845 A1 * | 5/2006 | Kwan | H04L 12/5693 370/235 |
| 2008/0288664 A1 | 11/2008 | Pettey et al. | |
| 2008/0310342 A1 | 12/2008 | Kruys et al. | |
| 2009/0161584 A1 | 6/2009 | Guan | |
| 2009/0204757 A1 | 8/2009 | Edwards, III et al. | |
| 2010/0027420 A1 | 2/2010 | Smith | |

(Continued)

*Primary Examiner* — Khaled Kassim
(74) *Attorney, Agent, or Firm* — Larson Newman, LLP

(57) ABSTRACT

An Ethernet device includes receive buffers and transmit buffers of a port, and a processor. The buffers are each associated with a respective class of service. The processor operates to determine a current buffer utilization in a receive buffer, determine that the current buffer utilization is different than a buffer threshold for the receive buffer, determine a data rate limit for the class of service associated with the receive buffer based upon the difference between the current buffer utilization and the buffer threshold, and send a data rate limit frame to another device coupled to the port. The data rate limit frame includes the data rate limit for the class of service.

15 Claims, 6 Drawing Sheets

(56) References Cited

U.S. PATENT DOCUMENTS

| | | | |
|---|---|---|---|
| 2010/0061269 A1 | 3/2010 | Banerjee et al. | |
| 2010/0103819 A1* | 4/2010 | Samuels | H04L 41/12 370/235 |
| 2010/0165995 A1 | 7/2010 | Mehta et al. | |
| 2010/0189440 A1* | 7/2010 | Julien | H04Q 11/0067 398/79 |
| 2010/0318647 A1 | 12/2010 | Savoor et al. | |
| 2012/0026877 A1* | 2/2012 | Rajappan | H04L 47/724 370/235 |
| 2012/0163175 A1* | 6/2012 | Gupta | H04L 47/10 370/235 |

* cited by examiner

SYSTEM AND METHOD FOR DYNAMIC RATE CONTROL IN ETHERNET FABRICS

CROSS REFERENCE TO RELATED APPLICATIONS

This application is a continuation of U.S. patent application Ser. No. 13/168,205, entitled "System and Method for Dynamic Rate Control in Ethernet Fabrics," filed on Jun. 24, 2011, the disclosure of which is hereby expressly incorporated by reference in its entirety.

FIELD OF THE DISCLOSURE

The present disclosure generally relates to information handling systems, and more particularly relates to dynamic rate control in an Ethernet fabric including an information handling system.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, and networking systems. Information handlings systems can also implement various virtualized architectures.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings. Other teachings can be used in this application, and the teachings can be used in other applications and with different types of architectures, such as a client-server architecture, a distributed computing architecture, or a middleware server architecture and associated resources.

Figures 1, 2:
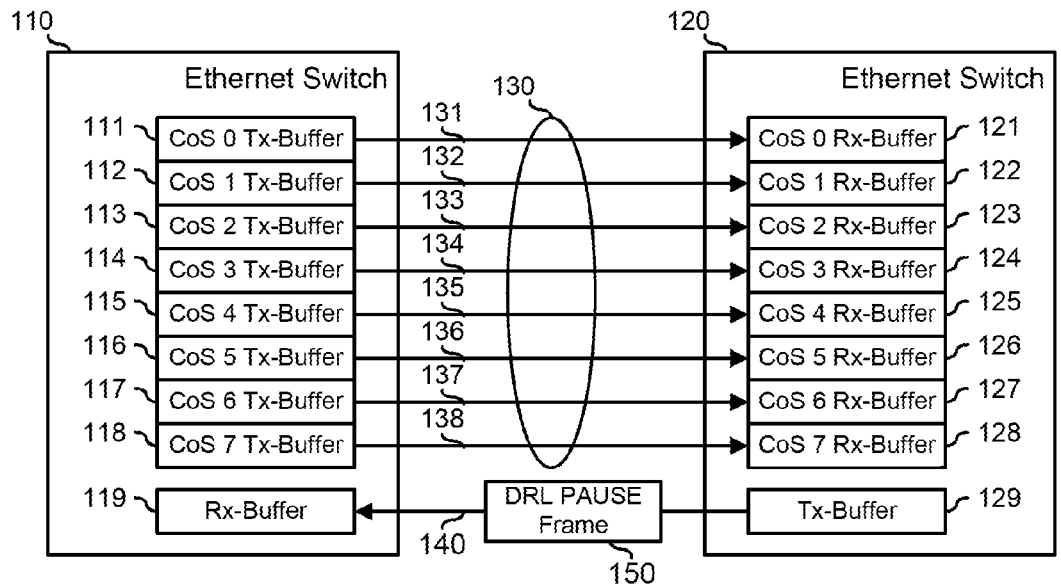
FIG. 1 is a block diagram of an Ethernet fabric according to an embodiment of the present disclosure.
FIG. 2 illustrates a data rate limit (DLR) frame that is operable on the Ethernet fabric of FIG. 1, according to an embodiment of the present disclosure.

FIG. 1 illustrates an embodiment of an Ethernet fabric 100 that can include one or more information handling systems. For purposes of this disclosure, the information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a PDA, a consumer electronic device, a network server or storage device, a switch router or other network communication device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communications between the various hardware components.

In a particular embodiment, Ethernet fabric 100 operates to implement a priority-based flow control (PFC), as defined by the Institute of Electrical and Electronics Engineers (IEEE) standard 802.1Qbb, to provide a link level flow control mechanism that can be controlled independently for each class of service (CoS), as defined by IEEE standard 802.1p, and includes Ethernet switches 110 and 120 that are linked together by a transmit link 130 and by a receive link 140. Ethernet switch 110 includes eight transmit buffers 111, 112, 113, 114, 115, 116, 117, and 118. Each transmit buffer 111-118 is associated with network traffic of a particular CoS 0-7, such that transmit buffer 111 is associated with CoS 0 traffic, transmit buffer 112 is associated with CoS 1 traffic, etc. Ethernet switch 110 also includes a receive buffer 119. Ethernet switch 120 includes eight receive buffers 121, 122, 123, 124, 125, 126, 127, and 128. Each receive buffer 121-128 is associated with network traffic of a particular CoS 0-7, such that receive buffer 121 is associated with CoS 0 traffic, receive buffer 122 is associated with CoS 1 traffic, etc. Ethernet switch 120 also includes a transmit buffer 129. Ethernet switches 110 and 120 each include one or more additional sets of transmit buffers and receive buffers. As used herein, the term "switch" includes other types of networking equipment, such as a router, a hub, a bridge, a gateway, a repeater, another type of networking equipment, or a combination thereof. In a particular embodiment, Ethernet switch 110, Ethernet switch 120, or both implement a buffer management scheme wherein each buffer is implemented as a separate buffer that is dedicated to the network traffic of the associated CoS. In another embodiment, Ethernet switch 110, Ethernet switch 120, or both implement a buffer management scheme wherein the buffers share a common pool of memory, and each CoS uses a portion of the common pool of memory based on the network traffic flow through the ports that is associated with the particular CoS.

Transmit buffers 111-118 are each connected to a corresponding receive buffer 121-128 via transmit link 130. Transmit link 130 represents a particular physical data link that operates to transmit data from Ethernet switch 110 to Ethernet switch 120, and is partitioned into eight virtual links 131, 132, 133, 134, 135, 136, 137, and 138, such that the transmit buffer 111 is connected to receive buffer 121 via virtual link 131, transmit buffer 112 is connected to receive buffer 122 via virtual link 132, etc. Transmit buffer 129 is connected to receive buffer 119 via receive link 140, and represents a particular physical data link that operates to transmit data from Ethernet switch 120 to Ethernet switch 110, and can be partitioned into virtual links similar to virtual links 131, 132, 133, 134, 135, 136, 137, and 138, as needed or desired.

In a particular embodiment, Ethernet fabric 100 operates to enforce a per CoS data rate limit (DRL). As such each of receive buffers 121-128 measure a current buffer utilization (CBU) and compare the CBU with a threshold level. If the CBU is below the threshold, then the receive buffer can handle a higher data rate of traffic for the associated CoS, but if the CBU is above the threshold, then the receive buffer should handle a lower data rate of traffic for the associated CoS. When a particular receive buffer 121-128 is determined to need a change in the data rate, Ethernet switch 120 sends a DRL frame 150 over receive link 140 to Ethernet switch 110. When Ethernet switch 110 receives DRL frame 150, then Ethernet switch 110 adjusts the egress bandwidth for the associated transmit buffer 111-118 to the DRL specified in the DRL frame, thereby matching the egress bandwidth to the data rate desired by the associated receive buffer 121-128. Thus if DRL frame 150 indicates a lower DRL than a current data rate for one of the transmit buffers 121-128, then Ethernet switch 110 reduces the egress bandwidth of the affected transmit buffer to the DRL specific in the DRL frame. If the DRL frame indicates a higher DRL than a current data rate for a transmit buffer, then Ethernet switch 110 increases the egress bandwidth of the affected transmit buffer to the DRL specific in the DRL frame. In a particular embodiment, Ethernet switch gradually increases the egress bandwidth of the affected transmit buffer to the DRL specific in the DRL frame.

For example, transmit link 130 can be a 10 gigabits per second (10 Gb/s) link where CoSs 0-3 each have a maximum link speed of 2 Gb/s, and CoSs 4-7 each have a maximum link speed of 500 megabits per second (500 Mb/s). However, due to network congestion, a particular link can have a DRL less than the maximum link speed associated with the link. For example, virtual link 135 can have a DRL that is 400 Mb/s. When the congestion clears, the CBU of receive buffer 125 can drop below the threshold for the receive buffer and Ethernet switch 120 can send DRL frame 150 to Ethernet switch 110, indicating that the data rate for transmit buffer 115 can increase. On the other hand, if the congestion gets worse and the CBU of receive buffer 125 goes above the threshold, then DRL frame 150 can indicate to Ethernet switch 110 that the data rate for transmit buffer 115 needs to be decreased.

FIG. 2 illustrates DRL frame 150, and includes a header field 151, an opcode field 152, a class enable vector field 153, eight DRL fields 154-161, and a cyclic redundancy check (CRC) field 162. Header field 151 includes a destination Media Access Control (MAC) address, a source MAC address, and an EtherType for the DRL frame. Opcode field 152 includes a coded identifier that the present frame is a DRL frame. Class enable vector field 153 is an 8-bit field where each bit represents one of the eight CoS, and the class enable vector field acts as a mask for the eight DRL fields 154-161. For example, if a particular bit of class enable vector field 153 includes a digital "1," then the associated DRL field 154, 155, 156, 157, 158, 159, 160, or 161 is selected and the DRL of the selected DRL field is applied to the associated transmit buffer 111-118. If a particular bit of class enable vector field 153 includes a digital "0," then the associated DRL field 154, 155, 156, 157, 158, 159, 160, or 161 is not selected and the DRL of the associated transmit buffer 111-118 is unchanged.

Figure 3:
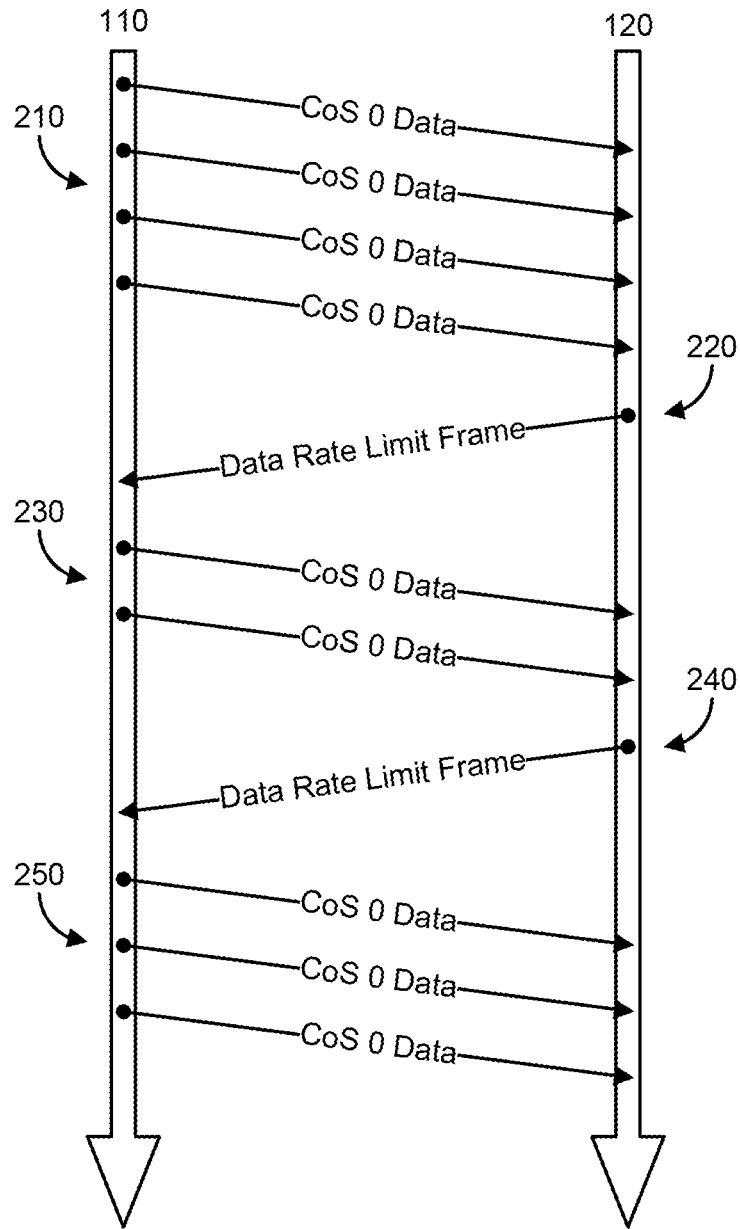
FIG. 3 illustrates data transfers and DRL frames communicated on the Ethernet fabric of FIG. 1, according to an embodiment of the present disclosure.

FIG. 3 illustrates data transfers and DRL frames communicated between Ethernet switch 110 and Ethernet switch 120. For example, at time 210, CoS 0 data can be communicated from CoS 0 transmit buffer 111 to CoS 0 receive buffer 121 at a data rate of 2 Gb/s. Receive buffer 121 can measure the CBU and compare the CBU with the threshold level for the receive buffer. At time 220, the CBU can be determined to be above the threshold, and Ethernet switch 120 can place a DRL frame in transmit buffer 129 to be communicated to receive buffer 119. The DRL frame can specify a lower DRL, such as a DRL of 1 Gb/s for CoS 0 data transfers. When Ethernet switch 110 receives the DRL frame, the data rate for CoS data transfers can be lowered to 1 Gb/s, and at time 230 CoS 0 data can be communicated from CoS 0 transmit buffer 111 to CoS 0 receive buffer 121 at a data rate of 1 Gb/s. At time 240, the CBU can be determined to be below the threshold, and Ethernet switch 120 can place another DRL frame in transmit buffer 129 to be communicated to receive buffer 119. The DRL frame can specify a higher DRL, such as a DRL of 1.5 Gb/s for CoS 0 data transfers. When Ethernet switch 110 receives the DRL frame, the data rate for CoS data transfers can be raised to 1.5 Gb/s, and CoS 0 data can be communicated from CoS 0 transmit buffer 111 to CoS 0 receive buffer 121 at a data rate of 1.5 Gb/s at time 250.

Figure 4:
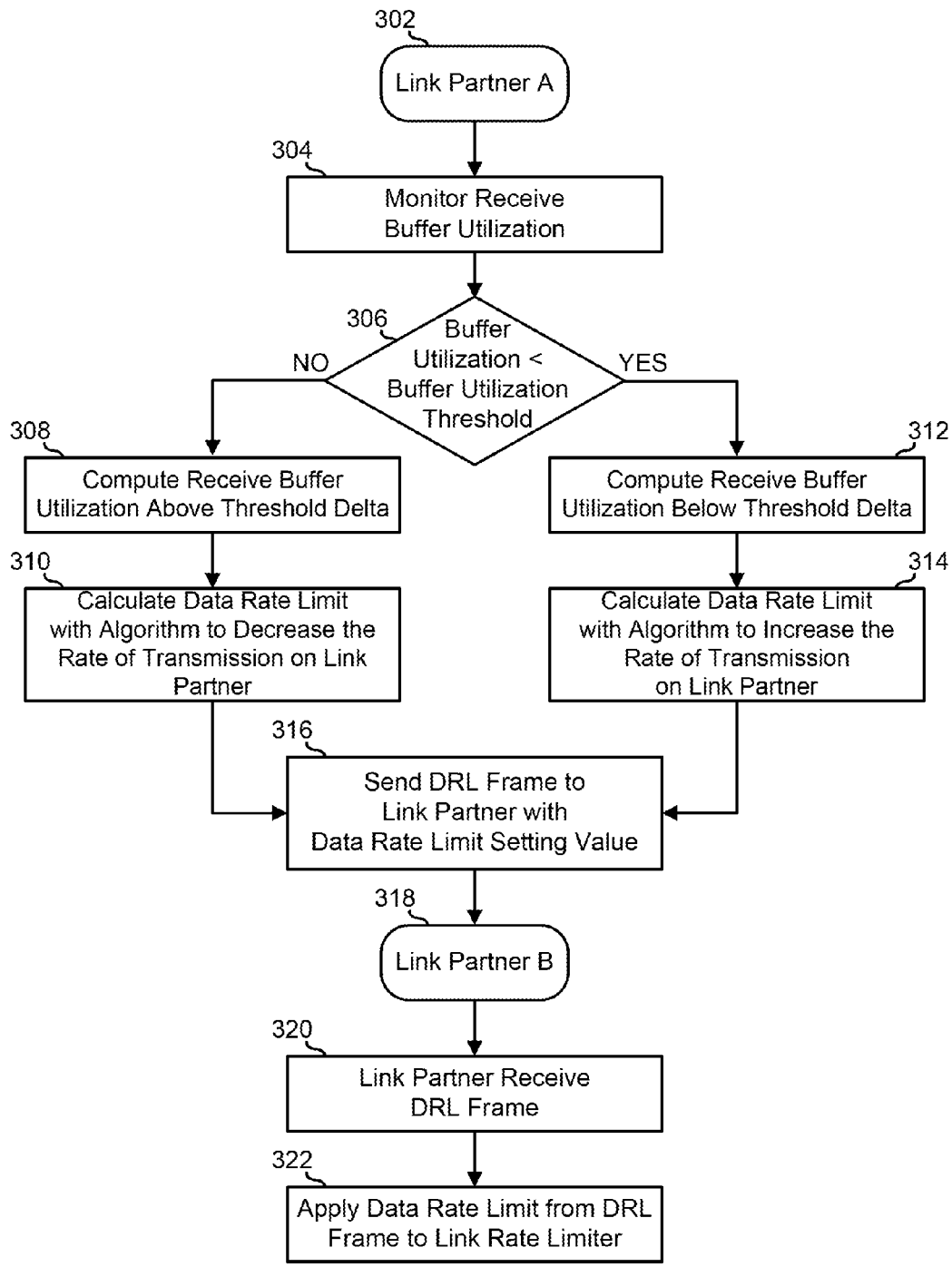
FIG. 4 is a flowchart illustrating a method of implementing a DRL mechanism on an Ethernet fabric, according to an embodiment of the present disclosure.

FIG. 4 illustrates a method of implementing a DRL mechanism on an Ethernet fabric, and begins in block 302 at a particular link partner, such as Ethernet switch 120. The receive buffer utilization is monitored at block 304. For example, each of receive buffers 121-128 can monitor their respective CBUs. A determination is made as to whether or not the buffer utilization is less than a buffer utilization threshold in decision block 306. If not, the "NO" branch of decision block 306 is taken and the delta that the receive buffer utilization is above the threshold is computed in block 308. A decrease DRL algorithm is used to calculate a new DRL to decrease the data transmission rate from the transmitting link partner in block 310. The new DRL is included in a DRL frame and the DRL frame is sent to the transmitting link partner in block 316. For example, DRL frame 150 can be sent from Ethernet switch 120 to Ethernet switch 110.

If in decision block 306 the buffer utilization is less than the buffer utilization threshold, the "YES" branch of decision block 306 is taken and the delta that the receive buffer utilization is below the threshold is computed in block 312. An increase DRL algorithm is used to calculate a new DRL to increase the data transmission rate from the transmitting link partner in block 314, and processing continues in block 316 where the new DRL is included in the DRL frame and the DRL frame is sent to the transmitting link partner. Note that both the "YES" branch and the "NO" branch of decision block 306 can be taken at the same time, the "YES" branch being taken for each receive buffer that has a buffer utilization that is less than the threshold, and the "NO" branch being taken for each receive buffer that has a buffer utilization that is greater than the threshold. Then, in block 316, each new DRL can be included in the DRL frame. The method proceeds in block 318 at the transmit link partner, such as Ethernet switch 110. The transmit link partner receives the DRL frame in block 320. For example, Ethernet switch 110 can receive DRL frame 150 at receive buffer 119. The new DRLs are applied to adjust the data rates for the transmits buffers in block 322.

Figure 5:
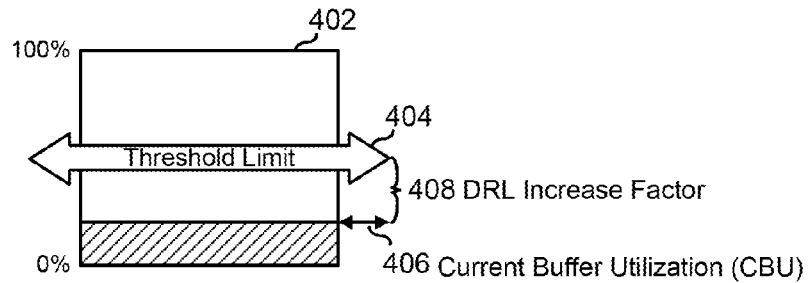
FIG. 5 illustrates an underutilized buffer of an Ethernet switch, according to an embodiment of the present disclosure.

FIG. 5 illustrates a buffer 402 that is underutilized. Buffer 402 includes a threshold 404. In a particular embodiment, the threshold can be at a 50% level. In another embodiment, the threshold can be at a different level, as needed or desired. A CBU 406 for buffer 402 is below threshold 404, and a DRL increase factor 408 is shown as the difference between the threshold and the CBU.

Figure 6:
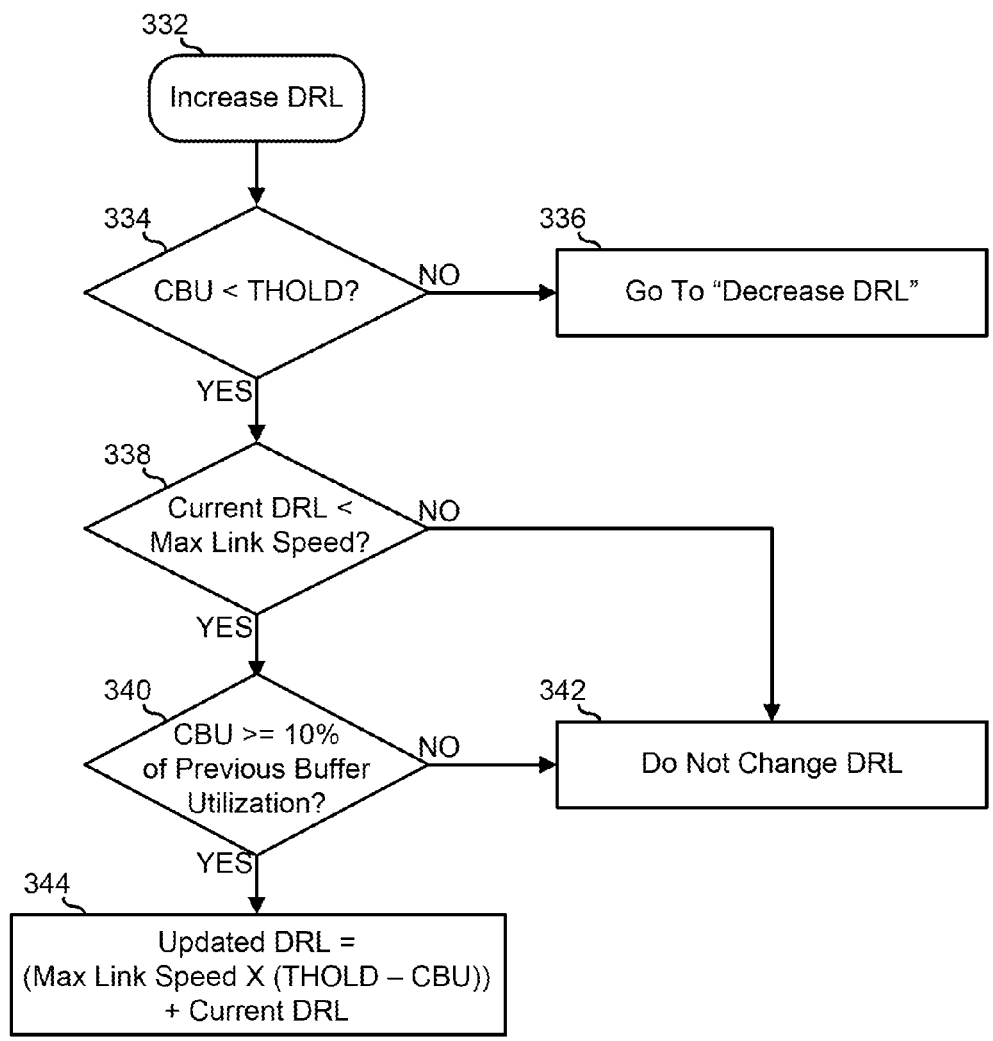
FIG. 6 is a flowchart illustrating a method of modifying a DRL when the buffer of FIG. 5 is underutilized.

FIG. 6 is a flowchart illustrating a method of modifying a DRL when buffer 402 is underutilized. The method begins at block 332, and a decision is made as to whether or not a CBU for a buffer is less than a threshold for the buffer in decision block 334. If not, the "NO" branch of decision block 334 is taken and processing proceeds at a decrease DRL algorithm in block 336. If the CBU for the buffer is less than the threshold for the buffer, the "YES" branch of decision block 334 is taken, and a decision is made as to whether or not the current DRL is less than a maximum link speed in decision block 338. If not, the "NO" branch of decision block 338 is taken, and the DRL is left unchanged in block 342. If the current DRL is less than the maximum link speed, the "YES" branch of decision block 338 is taken, and a decision is made as to whether or not the CBU is greater than or equal to 10% of the previous buffer utilization in decision block 340. If not, the "NO" branch of decision block 340 is taken, and the DRL is left unchanged in block 342. If the CBU is greater than or equal to 10% of the previous buffer utilization, the "YES" branch of decision block 340 is taken and the updated DRL is determined as:

$$DRL = (Max\_Link\_Speed \times (Threhold - CBU)) + Current\_DRL \quad \text{Equation 1}$$

in block 344, where (Threshold−CBU) is the DRL increase factor 408. Note that the decision in decision block 340 provides for a 10% factor in determining whether or not to modify a DRL. In this way, small changes in CBU do not trigger the sending of an excessive number of DRL packets. Another percentage can be used, as needed or desired. In another embodiment, instead of a particular percentage, a time period can be used to determine whether or not to modify a DRL.

Figure 7:
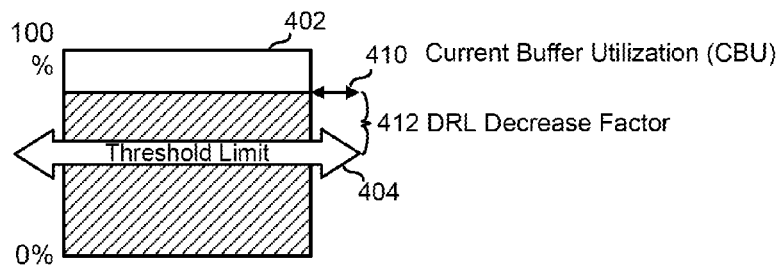
FIG. 7 illustrates an overutilized buffer of an Ethernet switch, according to an embodiment of the present disclosure.
Figure 8:
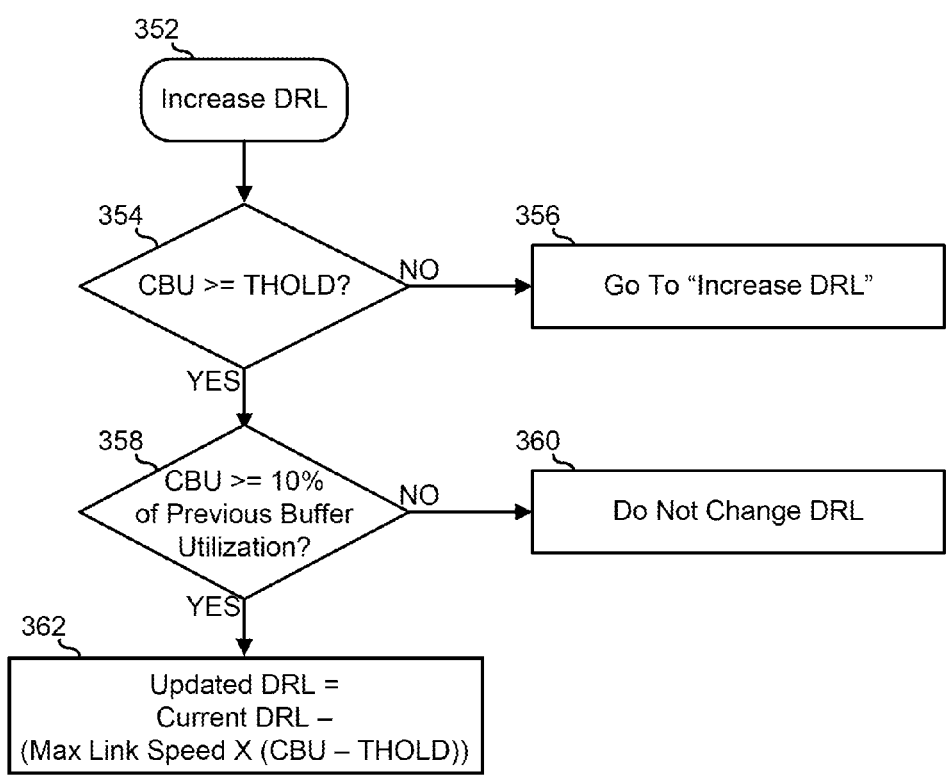
FIG. 8 is a flowchart illustrating a method of modifying a DRL when the buffer of FIG. 7 is overutilized.

FIG. 7 illustrates buffer 402 when it is overutilized. A CBU 410 for buffer 402 is above threshold 404, and a DRL decrease factor 408 is shown as the difference between the CBU and the threshold. FIG. 8 illustrates a method of modifying a DRL when buffer 402 is overutilized. The method begins at block 352, and a decision is made as to whether or not a CBU for a buffer is less than a threshold for the buffer in decision block 354. If not, the "NO" branch of decision block 354 is taken and processing proceeds at an increase DRL algorithm in block 356. If the CBU for the buffer is less than the threshold for the buffer, the "YES" branch of decision block 354 is taken, and a decision is made as to whether or not the CBU is greater than or equal to 10% of the previous buffer utilization in decision block 358. If not, the "NO" branch of decision block 458 is taken, and the DRL is left unchanged in block 360. If the CBU is greater than or equal to 10% of the previous buffer utilization, the "YES" branch of decision block 358 is taken and the updated DRL is determined as:

$$DRL = Current\_DRL - (Max\_Link\_Speed \times (CBU - Threshold)) \quad \text{Equation 2}$$

in block 362, where (CBU−Threshold) is the DRL decrease factor 412. Note that the decision in decision block 358 provides for a 10% factor in determining whether or not to modify a DRL. Another percentage or a time period can also be used, as needed or desired.

Note that the disclosed functions, devices, and methods are applicable to various embodiments of switches, routers, and other network devices. In a particular, the disclosed functions, devices, and methods are applicable in an embodiment where a network device implements a buffer management scheme where each buffer is implemented as a separate buffer that is dedicated to the network traffic of the associated CoS. Further, the disclosed functions, devices and methods are applicable in an embodiment where the network device implements a buffer management scheme where the buffers share a common pool of memory, and each CoS uses a portion of the common pool of memory based on the network traffic flow through the ports that is associated with the particular CoS. In this embodiment, a threshold can be applied to the common pool of memory on a per CoS basis, and a determination can be made whether or not a particular portion of the common pool associated with a particular CoS is above or below the associated threshold, and can modify the DRL for that CoS accordingly. In the alternative, a threshold can be applied to the common pool of memory. Then, if the current utilization of the common pool of memory exceeds the threshold, then a lower DRL can be applied to a particular CoS that is using the largest portion of the common pool of memory, and if the current utilization of the common pool of memory is lower than the threshold, then a higher DRL can be applied to a particular CoS that is using the smallest portion of the common pool of memory.

Figure 9:
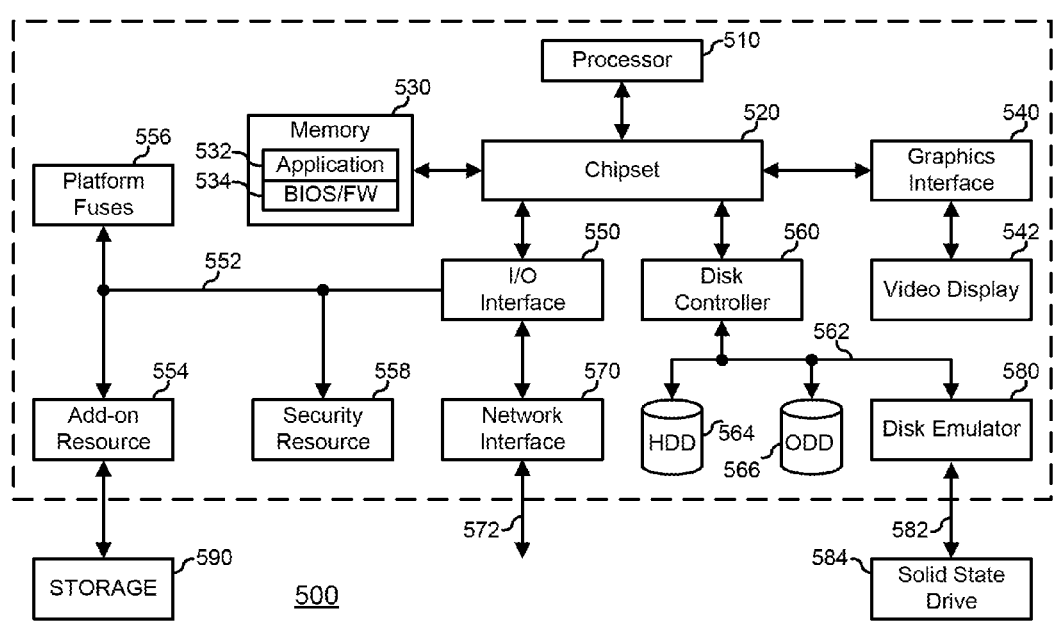
FIG. 9 is a block diagram illustrating an information handling system according to another embodiment of the present disclosure.

FIG. 9 is a block diagram illustrating an embodiment of an information handling system 500, including a processor 510, a chipset 520, a memory 530, a graphics interface 540, an input/output (I/O) interface 550, a disk controller 560, a network interface 570, and a disk emulator 580. In a particular embodiment, information handling system 500 is used to carry out one or more of the methods described herein. In another embodiment, one or more of the systems described herein are implemented in the form of information handling system 500.

Chipset 520 is connected to and supports processor 510, allowing the processor to execute machine-executable code. In a particular embodiment (not illustrated), information handling system 500 includes one or more additional processors, and chipset 520 supports the multiple processors, allowing for simultaneous processing by each of the processors and permitting the exchange of information among the processors and the other elements of the information handling system. Chipset 520 can be connected to processor 510 via a unique channel, or via a bus that shares information among the processor, the chipset, and other elements of information handling system 500.

Memory 530 is connected to chipset 520. Memory 530 and chipset 520 can be connected via a unique channel, or via a bus that shares information among the chipset, the memory, and other elements of information handling system 500. In another embodiment (not illustrated), processor 510 is connected to memory 530 via a unique channel. In another embodiment (not illustrated), information handling system 500 includes separate memory dedicated to each of the one or more additional processors. A non-limiting example of memory 530 includes static random access memory (SRAM), dynamic random access memory (DRAM), non-volatile random access memory (NVRAM), read only memory (ROM), flash memory, another type of memory, or any combination thereof.

Graphics interface 540 is connected to chipset 520. Graphics interface 540 and chipset 520 can be connected via a unique channel, or via a bus that shares information among the chipset, the graphics interface, and other elements of information handling system 500. Graphics interface 540 is connected to a video display 542. Other graphics interfaces (not illustrated) can also be used in addition to graphics interface 540 as needed or desired. Video display 542 includes one or more types of video displays, such as a flat panel display, another type of display device, or any combination thereof.

I/O interface 550 is connected to chipset 520. I/O interface 550 and chipset 520 can be connected via a unique channel, or via a bus that shares information among the chipset, the I/O interface, and other elements of information handling system 500. Other I/O interfaces (not illustrated) can also be used in addition to I/O interface 550 as needed or desired. I/O interface 550 is connected via an I/O interface 552 to one or more add-on resources 554. Add-on resource 554 is connected to a storage system 590, and can also include another data storage system, a graphics interface, a network interface card (NIC), a sound/video processing card, another suitable add-on resource or any combination thereof. I/O interface 550 is also connected via I/O interface 552 to one or more platform fuses 556 and to a security resource 558. Platform fuses 556 function to set or modify the functionality of information handling system 500 in hardware. Security resource 558 provides a secure cryptographic functionality and includes secure storage of cryptographic keys. A non-limiting example of security resource 558 includes a Unified Security Hub (USH), a Trusted Platform Module (TPM), a General Purpose Encryption (GPE) engine, another security resource, or a combination thereof.

Disk controller 560 is connected to chipset 520. Disk controller 560 and chipset 520 can be connected via a unique channel, or via a bus that shares information among the chipset, the disk controller, and other elements of information handling system 500. Other disk controllers (not illustrated) can also be used in addition to disk controller 560 as needed or desired. Disk controller 560 includes a disk interface 562. Disk controller 560 is connected to one or more disk drives via disk interface 562. Such disk drives include a hard disk drive (HDD) 564, and an optical disk drive (ODD) 566, and can include one or more disk drive as needed or desired. ODD 566 can include a Read/Write Compact Disk (R/W-CD), a Read/Write Digital Video Disk (R/W-DVD), a Read/Write mini Digital Video Disk (R/W mini-DVD), another type of optical disk drive, or any combination thereof. Additionally, disk controller 560 is connected to disk emulator 580. Disk emulator 580 permits a solid-state drive 584 to be coupled to information handling system 500 via an external interface 582. External interface 582 can include industry standard busses such as USB or IEEE 1394 (Firewire) or proprietary busses, or any combination thereof. Alternatively, solid-state drive 584 can be disposed within information handling system 500.

Network interface device 570 is connected to I/O interface 550. Network interface 570 and I/O interface 550 can be coupled via a unique channel, or via a bus that shares information among the I/O interface, the network interface, and other elements of information handling system 500. Other network interfaces (not illustrated) can also be used in addition to network interface 570 as needed or desired. Network interface 570 can be a network interface card (NIC) disposed within information handling system 500, on a main circuit board such as a baseboard, a motherboard, or any combination thereof, integrated onto another component such as chipset 520, in another suitable location, or any combination thereof. Network interface 570 includes a network channel 572 that provide interfaces between information handling system 500 and other devices (not illustrated) that are external to information handling system 500. Network interface 570 can also include additional network channels (not illustrated).

Information handling system 500 includes one or more application programs 532, and Basic Input/Output System and Firmware (BIOS/FW) code 534. BIOS/FW code 534 functions to initialize information handling system 500 on power up, to launch an operating system, and to manage input and output interactions between the operating system and the other elements of information handling system 500. In a particular embodiment, application programs 532 and BIOS/FW code 534 reside in memory 530, and include machine-executable code that is executed by processor 510 to perform various functions of information handling system 500. In another embodiment (not illustrated), application programs and BIOS/FW code reside in another storage medium of information handling system 500. For example, application programs and BIOS/FW code can reside in HDD 564, in a ROM (not illustrated) associated with information handling system 500, in an option-ROM (not illustrated) associated with various devices of information handling system 500, in storage system 590, in a storage system (not illustrated) associated with network channel 572, in another storage medium of information handling system 500, or a combination thereof. Application programs 532 and BIOS/FW code 534 can each be implemented as single programs, or as separate programs carrying out the various features as described herein.

In the embodiments described herein, an information handling system includes any instrumentality or aggregate of instrumentalities operable to compute, classify, process, transmit, receive, retrieve, originate, switch, store, display, manifest, detect, record, reproduce, handle, or use any form of information, intelligence, or data for business, scientific, control, entertainment, or other purposes. For example, an information handling system can be a personal computer, a consumer electronic device, a network server or storage device, a switch router, wireless router, or other network communication device, a network connected device (cellular telephone, tablet device, etc.), or any other suitable device, and can vary in size, shape, performance, price, and functionality. The information handling system can include memory (volatile (e.g. random-access memory, etc.), non-volatile (read-only memory, flash memory etc.) or any combination thereof), one or more processing resources, such as a central processing unit (CPU), a graphics processing unit (GPU), hardware or software control logic, or any combination thereof. Additional components of the information handling system can include one or more storage devices, one or more communications ports for communicating with external devices, as well as, various input and output (I/O) devices, such as a keyboard, a mouse, a video/graphic display, or any combination thereof. The information handling system can also include one or more buses operable to transmit communications between the various hardware components. Portions of an information handling system may themselves be considered information handling systems.

When referred to as a "device," a "module," or the like, the embodiments described herein can be configured as hardware. For example, a portion of an information handling system device may be hardware such as, for example, an integrated circuit (such as an Application Specific Integrated Circuit (ASIC), a Field Programmable Gate Array (FPGA), a structured ASIC, or a device embedded on a larger chip), a card (such as a Peripheral Component Interface (PCI) card, a PCI-express card, a Personal Computer Memory Card International Association (PCMCIA) card, or other such expansion card), or a system (such as a motherboard, a system-on-a-chip (SoC), or a stand-alone device). The device or module can include software, including firmware embedded at a device, such as a Pentium class or PowerPC™ brand processor, or other such device, or software capable of operating a relevant environment of the information handling system. The device or module can also include a combination of the foregoing examples of hardware or software. Note that an information handling system can include an integrated circuit or a board-level product having portions thereof that can also be any combination of hardware and software.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. An Ethernet device comprising:
    a port including a plurality of receive buffers, each receive buffer being associated with a respective virtual link of the port, and each virtual link being associated with a respective class of service of a plurality of classes of service; and a processor that:
    determines a first data rate limit for a first one of the classes of service associated with a first one of the receive buffers based upon a difference between a first current buffer utilization of the first buffer and a first buffer threshold for the first buffer, wherein the first receive buffer is associated with a first one of the virtual links; and
    sends a first data rate limit frame to another Ethernet device coupled to the port, the first data rate limit frame including the first data rate limit and a first class enable vector bit that associates the first data rate limit with the first virtual link;
    wherein:
    the port further includes a plurality of transmit buffers, each transmit buffer being associated with a respective one of the virtual links; and the processor further:
    receives a second data rate limit frame from the other Ethernet device, the second data rate limit frame including a second data rate limit and a second class enable vector bit that associates the second data rate limit with the second virtual link; and
    sets a first data rate for a first one of the transmit buffers based upon the second data rate limit, wherein the first transmit buffer is associated with the second virtual link;
    wherein:
    the second data rate limit frame further includes a third data rate limit and a third class enable vector bit that associates the second data rate limit with the third virtual link the processor further sets a second data rate for a second one of the transmit buffers based upon the third data rate limit, wherein the second transmit buffer is associated with the third virtual link.

2. The Ethernet device of claim 1, wherein the processor further:
    determines a second data rate limit for a second one of the classes of service associated with a second one of the receive buffers based upon a difference between the second current buffer utilization of the second buffer and a second buffer threshold for the second buffer, wherein the second receive buffer is associated with a second one of the virtual links;
    the first data rate limit frame further including the second data rate limit and a second class enable vector bit that associates the second data rate limit with the second virtual link.

3. The Ethernet device of claim 1, wherein in determining the first data rate limit for
    the first class of service, the processor further: determines that the first current buffer utilization is different from a previous current buffer utilization for the first receive buffer by less than a first amount; and if the first current buffer utilization is different from the previous current buffer utilization by less than the first amount, determines to not send the first data rate limit frame.

4. The Ethernet device of claim 3, wherein the first amount is ten percent.

5. The Ethernet device of claim 1, wherein if the first current buffer utilization is less than the first buffer threshold, then the first data rate limit is greater than a previous data rate limit for the class of service.

6. The Ethernet device of claim 1, wherein if the first current buffer utilization is greater than the first buffer threshold, then the first data rate limit is less than a previous data rate limit for the class of service.

7. A method of controlling Ethernet traffic, the method comprising:
providing, on a port of an Ethernet device, a plurality of receive buffers, each receive buffer being associated with a respective virtual link of the port, and each virtual link being associated with a respective class of service of a plurality of classes of service;
determining, by a processor of the Ethernet device, a first data rate limit for a first one of the classes of service associated with a first one of the receive buffers based upon a difference between a first current buffer utilization of the first buffer and a first buffer threshold for the first buffer, wherein the first receive buffer is associated with a first one of the virtual links; and
sending a first data rate limit frame to another Ethernet device coupled to the port, the first data rate limit frame including the first data rate limit and a first class enable vector bit that associates the first data rate limit with the first virtual link;
wherein: the port further includes a plurality of transmit buffers, each transmit buffer being associated with a respective one of the virtual links; and
the method further comprises:
receiving, by the processor, a second data rate limit frame from the other Ethernet device, the second data rate limit frame including a second data rate limit and a second class enable vector bit that associates the second data rate limit with the second virtual link; and
setting a first data rate for a first one of the transmit buffers based upon the second data rate limit, wherein the first transmit buffer is associated with the second virtual link;
wherein:
the second data rate limit frame further includes a third data rate limit and a third class enable vector bit that associates the second data rate limit with the third virtual link,
and the method further comprises:
setting a second data rate for a second one of the transmit buffers based upon the third data rate limit, wherein the second transmit buffer is associated with the third virtual link.

8. The method of claim 7, further comprising:
determining, by the processor, a second data rate limit for a second one of the classes of service associated with a second one of the receive buffers based upon a difference between the second current buffer utilization of the second buffer and a second buffer threshold for the second buffer, wherein the second receive buffer is associated with a second one of the virtual links;
wherein the first data rate limit frame further includes the second data rate limit and a second class enable vector bit that associates the second data rate limit with the second virtual link.

9. The method of claim 7, wherein in determining the first data rate limit for the first class of service, the method further comprises: determining, by the processor that the first current buffer utilization is different from a previous current buffer utilization for the first receive buffer by less than a first amount; and
if the first current buffer utilization is different from the previous current buffer utilization by less than the first amount, determining to not send the first data rate limit frame.

10. The method of claim 9, wherein the first amount is ten percent.

11. The method of claim 7, wherein if the first current buffer utilization is less than the first buffer threshold, then the first data rate limit is greater than a previous data rate limit for the class of service.

12. The method of claim 7, wherein if the first current buffer utilization is greater than the first buffer threshold, then the first data rate limit is less than a previous data rate limit for the class of service.

13. A non-transitory computer-readable medium including code for performing a method, the method comprising:
providing, on a port of an Ethernet device, a plurality of receive buffers, each receive buffer being associated with a respective virtual link of the port, and each virtual link being associated with a respective class of service of a plurality of classes of service;
determining a first data rate limit for a first one of the classes of service associated with a first one of the receive buffers based upon a difference between a first current buffer utilization of the first buffer and a first buffer threshold for the first buffer, wherein the first receive buffer is associated with a first one of the virtual links; and sending a first data rate limit frame to another Ethernet device coupled to the port, the first data rate limit frame including the first data rate limit and a first class enable vector bit that associates the first data rate limit with the first virtual link;
wherein:
the port further includes a plurality of transmit buffers, each transmit buffer being associated with a respective one of the virtual links; and
the method further comprises:
receiving, by the processor, a second data rate limit frame from the other Ethernet device, the second data rate limit frame including a second data rate limit and a second class enable vector bit that associates the second data rate limit with the second virtual link; and
setting a first data rate for a first one of the transmit buffers based upon the second data rate limit, wherein the first transmit buffer is associated with the second virtual link;
wherein:
the second data rate limit frame further includes a third data rate limit and a third class enable vector bit that associates the second data rate limit with the third virtual link,
and the method further comprises:
setting a second data rate for a second one of the transmit buffers based upon the third data rate limit, wherein the second transmit buffer is associated with the third virtual link.

14. The computer-readable medium of claim 13, the method further comprising:
determining, by the processor, a second data rate limit for a second one of the classes of service associated with a second one of the receive buffers based upon a difference between the second current buffer utilization of the second buffer and a second buffer threshold for the second buffer, wherein the second receive buffer is associated with a second one of the virtual links;
wherein the first data rate limit frame further includes the second data rate limit and a second class enable vector bit that associates the second data rate limit with the second virtual link.

15. The computer-readable medium of claim 13, wherein in determining the first data rate limit for the first class of service, the method further comprises: determining, by the processor that the first current buffer utilization is different from a previous current buffer utilization for the first receive buffer by less than a first amount; and if the first current buffer utilization is different from the previous current buffer utilization by less than the first amount, determining to not send the first data rate limit frame.

\* \* \* \* \*